(12) United States Patent
Nguyen et al.

(10) Patent No.: US 10,210,208 B2
(45) Date of Patent: Feb. 19, 2019

(54) VIEWABLE SUGGESTIONS FOR FEDERATION ENGINE

(71) Applicant: Red Hat, Inc., Raleigh, NC (US)

(72) Inventors: Filip Nguyen, Brno (CZ); Filip Elias, Vysni Lhoty (CZ)

(73) Assignee: RED HAT, INC., Raleigh, NC (US)

( * ) Notice: Subject to any disclaimer, the term of this patent is extended or adjusted under 35 U.S.C. 154(b) by 1066 days.

(21) Appl. No.: 14/537,423

(22) Filed: Nov. 10, 2014

(65) Prior Publication Data

US 2016/0132556 A1    May 12, 2016

(51) Int. Cl.
*G06F 17/30*    (2006.01)
(52) U.S. Cl.
CPC .............. *G06F 17/30448* (2013.01)
(58) Field of Classification Search
CPC ............ G06F 17/30448; G06F 17/30
See application file for complete search history.

(56) References Cited

U.S. PATENT DOCUMENTS

| 7,383,256 | B2* | 6/2008 | Larson | G06F 17/30451 |
| 7,734,565 | B2* | 6/2010 | Carnahan | G06F 17/30864 |
| 2007/0282856 | A1 | 12/2007 | Mueller et al. | |
| 2008/0249981 | A1 | 10/2008 | Norring et al. | |
| 2009/0177697 | A1* | 7/2009 | Gao | G06F 17/30457 |
| 2012/0150792 | A1 | 6/2012 | Yassin et al. | |
| 2012/0259812 | A1 | 10/2012 | Rangarajan et al. | |
| 2013/0290374 | A1 | 10/2013 | Chand et al. | |

OTHER PUBLICATIONS

US 8,805,898, 08/2014, Mohan (withdrawn)
Using Data Federation Technology in IBM WebSphere Information Integrator; Data Federation Usage Examples and Performance Tuning, 20 pages; http://www.ibm.com/developerworks/data/library/techarticle/dm-0505lin/.
SQL Azure Federation-Introduction; 5 pages; http://geekswithblogs.net/shaunxu/archive/2012/01/07/sql-azure-federation-ndash-introduction.aspx.
Chapter 6. Quickstarts; 4 pages; https://access.redhat.com/documentation/en-US/Red_Hat_JBoss_Data_Virtualization/6/html/Getting_Started_Guide/chap-Quickstarts.html.

* cited by examiner

*Primary Examiner* — Kristopher Andersen
(74) *Attorney, Agent, or Firm* — Haynes and Boone, LLP (57) ABSTRACT

Methods, systems, and computer program products for converting a query to a canonical query; inserting the query and the canonical query into a database; searching one or more viewable sets stored in the database to determine whether the canonical query is similar to one or more canonical queries associated with the one or more viewable sets; and upon determining a similar canonical query, returning a first view suggestion associated with a first viewable set of the one or more viewable sets that includes the similar canonical query.

18 Claims, 5 Drawing Sheets

VIEWABLE SUGGESTIONS FOR FEDERATION ENGINE

BACKGROUND

The present invention relates to database and database management systems, and more particularly to data federation.

A data federation system is a type of database management system (DBMS). In a data federation system, a federation engine may be coupled to a plurality of data sources from which the federation engine may access data. Queries for data stored in the plurality of data sources may be received by the federation engine from a plurality of clients. The federation engine may decompose each received query into sub-queries that are distributed to the plurality of data sources. The results of the sub-queries may be aggregated by the federation engine into result sets that are returned to the clients in response to the received queries.

A data federation system may be optimized by creating one or more re-usable "virtual" views that store aggregated results from the sub-queries. Data federation systems typically require a data architect to define the views.

Many data federation systems utilize a large number of data tables and process a large number of queries of the data tables. Accordingly, determining views to optimize performance of the data federation system may be a complex task that is time-intensive.

BRIEF SUMMARY

According to one embodiment a federated system comprises at least one processor in communication with a memory; a federation multidiff communicatively coupled to a multidiff statistics engine to forward a received query to the multidiff statistics engine; a multidiff console communicatively coupled to the multidiff statistics engine to display a first viewable set and a first view suggestion; the multidiff statistics engine to: perform a first similarity search of a canonical query database to group a plurality of canonical queries that are similar into the first viewable set, wherein the first viewable set is associated with the first view suggestion; convert the received query to a canonical query by transforming any join operators to equivalent cross join operators, removing constants from any "WHERE" clauses, and ordering any items in each clause; insert the canonical query into the canonical query database; perform a second similarity search of the canonical query database to determine whether the canonical query is similar to the plurality of canonical queries associated with the first viewable set; and upon determining that the canonical query is similar to the plurality of canonical queries associated with the first viewable set, send the view suggestion to a client with a result of the received query.

According to another embodiment, a method comprises converting a received query to a canonical query; inserting the received query and the canonical query into a query data store; performing a first similarity search of one or more viewable sets stored in the query data store to determine whether the canonical query is similar to one or more canonical queries associated with the one or more viewable sets; and upon determining a similar canonical query, returning a view suggestion associated with a viewable set of the one or more viewable sets that includes the similar canonical query.

According to yet another embodiment, a non-transitory computer-readable medium comprises computer-readable instructions, the computer-readable instructions executable by a processor to cause the processor to: convert a received query to a canonical query; insert the received query and the canonical query into a query data store; perform a first similarity search of one or more viewable sets stored in the query data store to determine whether the canonical query is similar to one or more canonical queries associated with the one or more viewable sets; and return a view suggestion associated with a viewable set of the one or more viewable sets that includes the similar canonical query.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
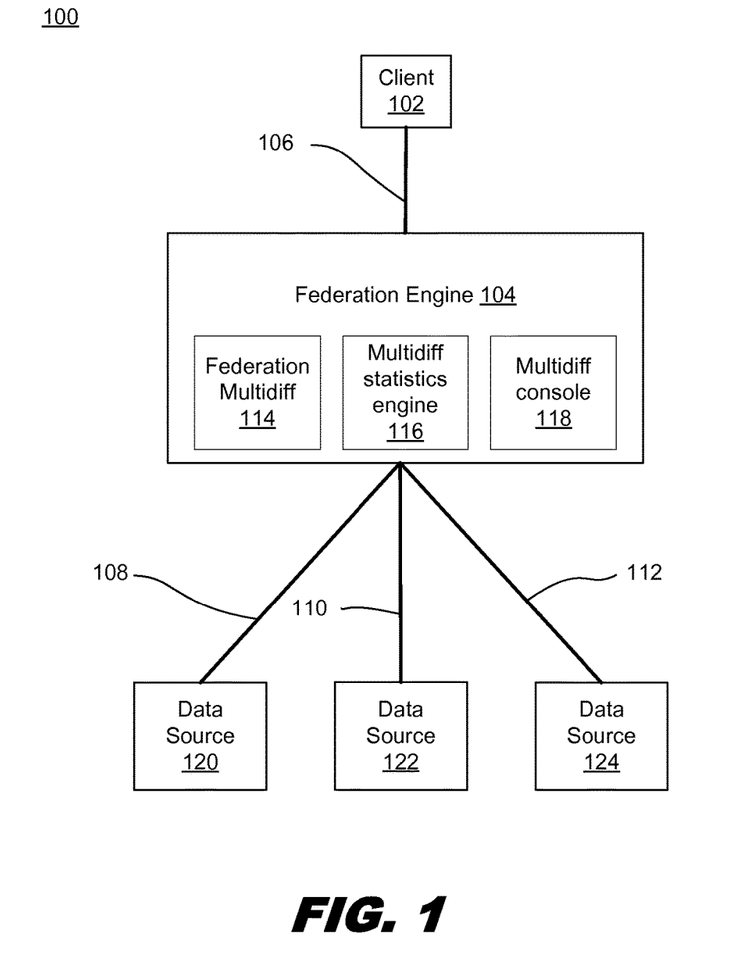
FIG. 1 is a block diagram illustrating a federated system architecture, in accordance with various examples of the present disclosure.

FIG. 1 illustrates an exemplary federated system architecture 100 in which examples of the present disclosure can be implemented. In federated system architecture 100, client 102 (e.g., user machine), a first data source 120, a second data source 122, a third data source 124 and federation engine 104 are communicatively coupled via connections 106, 108, 110 and 112 that represent any combination or physical and/or wireless connections. Each connection may be part of a network. A network may be a public network (e.g., the Internet), a private network (e.g., a local area network (LAN) or wide area network (WAN)), or a combination thereof. In an example, the network may include the Internet and/or one or more intranets, landline networks, wireless networks, and/or other appropriate types of communication networks. In an example, the network may comprise a wireless telecommunications network (e.g., cellular phone network) adapted to communicate with other communication networks, such as the Internet.

In an example, there may be one or more of each illustrated component (e.g., a plurality of clients, one data source, a plurality of data sources, and so forth).

Client 102 may be a computing device, such as a personal computer (PC), laptop, mobile phone, smart phone, smart television, tablet computer, or any other type of computing device. Client 102 may run an operating system (OS) that manages hardware and software of a respective machine. The operating system may be any standard or proprietary OS. A browser may run on the OS of a client. The browser may be a web browser that can access content and services provided by federation engine 104. Further, other types of software applications (e.g., applications, mobile applications, "apps") running on client 102 may provide access to content and services of federation engine 104 without the use of a browser. A user of client 102 may be a data architect, who utilizes federation multidiff 114, multidiff statistics engine 116 and multidiff console 118 to assist in defining views for federation engine 104. These views allow federation engine 104 to more efficiently respond to queries for data from data sources 120, 122 and 124.

In the present example, data sources 120, 122 and 124 may each be a computing device that is configured with any standard or proprietary data store. For example, a data store may be an SQL-compliant database. In another example, a data store may be a flat file. Data stores may be homogenous or heterogeneous (e.g., data source 120 may be associated with an SQL-compliant database data store, data source 122 may be associated with a web service data store and data source 124 may be associated with a flat file data store).

Each data source 120, 122 and 124 may be a computing device such as a rackmount server, a router computer, a personal computer, a portable digital assistant, a mobile phone, a laptop computer, a tablet computer, a camera, a video camera, a netbook, a desktop computer, a media center, or any combination thereof. A computing device may be configured with one or more data stores.

Each data source may be structured with one or more applications that receive queries from federation engine 104, process the queries to retrieve results from the appropriate one or more data stores and returning the results of the queries to federation engine 104. In one example, an interface such as a Java Database Connectivity (JDBC) API is implemented on a data source using a JDBC driver, in order for the data source to retrieve data from the data store associated with the data source by processing queries from federation engine 104 that conform to the specifications of the interface.

In the present example, federation engine 104 is structured as a federated database management system software and is stored on and executed by a machine such as a rackmount server, a router computer, a personal computer, a portable digital assistant, a mobile phone, a laptop computer, a tablet computer, a camera, a video camera, a netbook, a desktop computer, a media center, or any combination thereof.

Federation engine 104 is structured to receive a federated query from a client (e.g., client 102), parse the federated query into sub-queries (e.g., a first sub-query for a first data source 120, a second sub-query for a second data source 122 and a third sub-query for a third data source 124), retrieve results for the sub-queries from the data sources, aggregate the sub-query results and present the aggregated sub-query results to the client.

Re-usable "virtual" views may be created by federation engine 104 in order to store aggregated results of the sub-queries locally by federation engine 104 such that future queries of the data in the view may be processed by federation engine 104 accessing the view directly rather than by sending sub-queries to data sources and aggregating the sub-query responses.

In the present example, federation engine 104 includes federation multidiff 114 and multidiff statistics engine 116. Federation multidiff 114 is communicatively coupled with multidiff statistics engine 116 such that federation multidiff 114 can forward a query, such as a query from client 102 to multidiff statistics engine 116. Multidiff statistics engine 116 may respond to federation multidiff 114 with a view suggestion that federation multidiff 114 may append to the response to the query, such that client 102 receives both the query response and the view suggestion. Accordingly, federation multidiff 114 may be structured to act as a communication interface with client 102 for receiving queries from client 102 and responding to client 102 with query responses. Multidiff statistics engine 116 may be structured to act as a back-end that determines view suggestions for federation multidiff 114.

In the present example, view suggestions are sent to clients along with a query response in order to allow for clients to be notified regarding federation engine 104 views that may be queried for more efficient processing of similar queries. Accordingly, the next time a client has a similar query, the client may modify query syntax to instruct federation engine to query the data from the appropriate view.

Multidiff console 118 may be an interface communicatively coupled to multidiff statistics engine 116 that allows a data architect to review multidiff statistics engine 116 data. In particular, a data architect may review sets of similar queries, referred to as "viewable sets." Viewable sets are associated with view suggestions that the data architect may review, edit, activate, and deactivate.

A data architect may access multidiff console 118 either locally (e.g., from the same machine that hosts federation engine 104) or remotely (e.g., from a client such as client 102). Multidiff console 118 may be accessible via a web-based interface such as a web browser or by another type of application (e.g., applications, mobile applications and "apps") that provides access to content and services of multidiff console 118 without the use of a browser.

Figure 2:
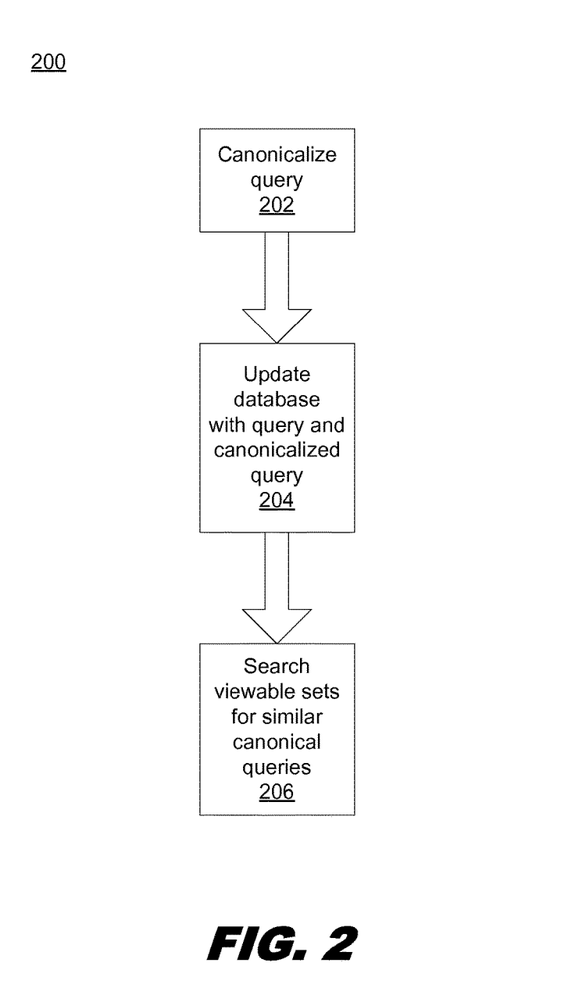
FIG. 2 is a flow diagram illustrating view suggestion search, according to an example of the present disclosure.

FIG. 2 is a flow diagram illustrating view suggestion search, according to an example of the present disclosure. The method 200 may be performed by processing logic that may comprise hardware (e.g., circuitry, dedicated logic, programmable logic and microcode), software (such as instructions run on a general purpose computer system, dedicated machine, or processing device), firmware, or a combination thereof.

At block 202, a query is canonicalized and output as a canonical query. In the present example, the query is a client query that is received by a federation multidiff component and sent to a multidiff statistics engine. The multidiff statistics engine performs the canonicalization of the query.

The canonicalization of the query may include any methods to transform the query to a standardized form. In the present example, the query is an SQL query that is canonicalized by: (i) transforming all JOIN operators to "cross join" form; (ii) removing all constants from the WHERE clause; and (iii) ordering (e.g., alphabetically) items in each clause.

For example, as according to the above transformation steps, if a received query is "SELECT*FROM table1,table2 WHERE table1.foreignkey=table2.primarykey", the received query may be converted to the following "cross join" query: "SELECT*FROM table1 CROSS JOIN table2."

The above example pertains to transforming a query from an "inner join" form to a "cross join" form. In another example, if a WHERE clause of a table has a constant, such as "table1.key=constant,", the "table1.key=constant" portion of the query may be removed.

The above example pertains to removing all constants from the WHERE clause. In another example, if the query includes "SELECT people,departments," the SELECT clause may be transformed to "SELECT departments, people," in order to order the items in the clause alphabetically.

Accordingly, by transforming the query to "cross join" form, removing all constants from the WHERE clause of the query, and ordering the items in each clause of the query, the query is canonicalized.

In another example, another canonicalization method may be performed to transform queries into a standard form in order to more easily and accurately determine query similarity (e.g., non-canonical query comparisons may be an "apples-to-oranges" comparison, whereas canonical query comparisons represent "apples-to-apples" comparisons of similar items).

In block 204, the multidiff statistics engine may update a data store such as a database by adding the query and the canonical query to the database.

In block 206, the multidiff statistics engine may search through the data store to determine whether there are any sets of queries that have canonical queries that are similar to the input canonical query. The sets of queries are referred to as "viewable sets." Grouping queries into viewable sets will be discussed further in regard to FIG. 3.

Each viewable set is associated with a "view suggestion" that is disabled initially but may be enabled by a data architect. If a viewable set is located that is similar to the canonical query and the view suggestion associated with the viewable set is enabled, then the view suggestion is returned to the client. If no viewable sets are determined to be similar then no view suggestion is returned to the client. Similarly, if a viewable set is determined to be similar, but its associated view suggestion is disabled, then no view suggestion is returned to the client.

Figure 3:
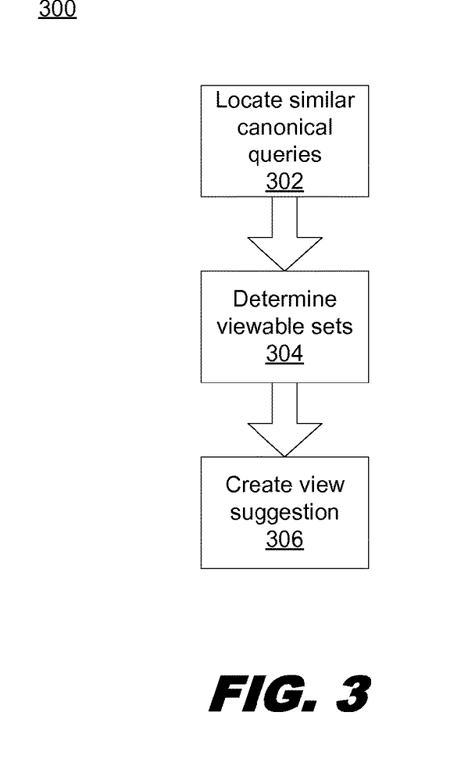
FIG. 3 is a flow diagram illustrating view suggestion creation, in accordance with various examples of the present disclosure.

FIG. 3 is a flow diagram illustrating view suggestion creation, according to an example of the present disclosure. The method 300 may be performed by processing logic that may comprise hardware (e.g., circuitry, dedicated logic, programmable logic and microcode), software (such as instructions run on a general purpose computer system, dedicated machine, or processing device), firmware, or a combination thereof.

At block 302, the multidiff statistics engine executes a search of the multidiff statistics engine data store to determine sets of similar queries, referred to as "viewable sets." In the present example, the search is repeated periodically based on a user-configured time interval in order to keep the sets of similar queries updated.

Sets of similar queries may be determined using approximate string matching, also referred to as fuzzy search, between the canonical queries stored by the multidiff statistics engine.

Any similarity search algorithm may be used to search for similar queries. In an example similarity search, a brute force search algorithm may be used that selects each query in the multidiff statistics engine data store, and performs a matching between the canonical query string associated with the query and all other canonical query strings associated with queries in the data store. Accordingly, after completing the similarity search, all similar queries may be located. Other, more efficient similarity searches may be performed instead of brute force searching, which is merely an example of one similarity search method that may be performed.

The matching between canonical query strings may relax the similarity, for example on the SELECT clause, in order to locate similar query strings with a broader range of data in the SELECT clause. Examples of relaxing similarity for a clause include, for example, requiring a lower degree of match for the items in the clause than for clauses in which the similarity search is not relaxed. The SELECT clause of an SQL statement, in particular, is a good candidate for inexact matching as a data architect may be less interested in which particular data is queried in the table, and more interested in the table identity itself, which may be derived from the FROM clause. According to this example, a data architect may find it desirable to perform exact matching on the FROM clause and inexact matching on the SELECT clause.

At block 304, the queries that are determined to be similar based on the similarity search are grouped into viewable sets, such that each viewable set comprises queries that are similar.

At block 306, a view suggestion may be created for each viewable set. The view suggestion may be query syntax that is generated for querying a view relating to the data requested in the similar queries. Since the view may not exist yet, the view suggestion is initially set to "disabled." A view suggestion may be enabled by a data architect, once a view is created, in order to allow the view suggestion to be sent to clients. Enabling or disabling a view suggestion may be performed by setting a variable associated with the view suggestion to a value indicating the "enabled" or "disabled" status of the view suggestion.

A data architect may periodically review viewable sets and their associated view suggestions using the multidiff console. A data architect may use the multidiff console to search and display all disabled view suggestions so that the data architect may efficiently review viewable set candidates for the creation of views. Ideal viewable set candidates for view creation may be, for example, viewable sets that include queries that are occur frequently and/or access a large amount of data from different data sources. Non-ideal viewable set candidates may be, for example, viewable sets that include only a small number of queries occur infrequently. Based on the information provided by each viewable set, the data architect may create a view for the viewable set using the federation engine. Using the multidiff console, the data architect may update the view suggestion with the data pertaining to the created view. The data architect may then use the multidiff console to set the view suggestion for the viewable set to "enabled" in order to allow for the view suggestion to be returned to users who submit queries that are similar the queries of the viewable set (as is illustrated in FIG. 2).

The view suggestion provides information to the users regarding the created view, such that the users may optimize the syntax of future similar queries to query the view stored by the federation engine rather than the data stores of the data sources. Accordingly, the data federation may be optimized by more efficiently locating query results from a view.

Figure 4:
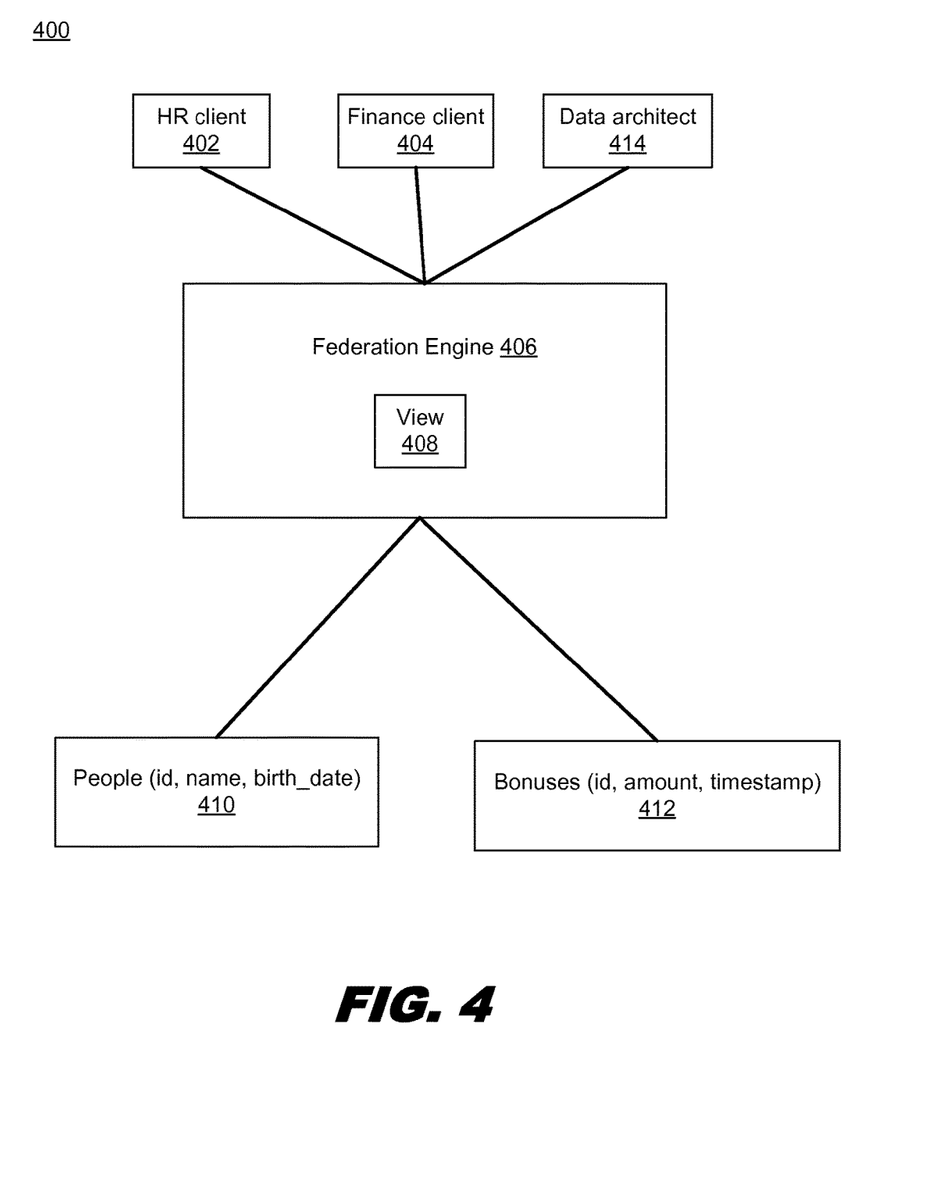
FIG. 4 is a block diagram illustrating a federated system architecture of an example organization, in accordance with various examples of the present disclosure.

FIG. 4 illustrates a federated system architecture 400 of an example organization in which examples of the present disclosure can be implemented.

Sometimes, a sudden change in an organization may change the typical use of a data federation system, as is illustrated in the following example. The present invention provides a mechanism to efficiently address the sudden change and optimize query processing pertaining to the change.

In this example, there are two tables: people 410 and bonuses 412. Each table resides on a different data source. HR client 402 submits data queries to federation engine 406 for data from people 410, in particular from the name and birth_date columns. Finance client 404 submits data queries to federation engine 406 for data from bonuses 412, in particular from the id and amount columns. Data from the two tables is only infrequently accessed together, and therefore data architect 414 has not created a view for the data from the two tables.

Suddenly there is an organizational change. Now there is a need by HR client 402 for reports that contain listings of people names and the bonus amounts corresponding to those names.

Accordingly, after the organizational change, the people 410 and bonuses 412 may frequently be accessed together by HR client 402 in order to determine both name and bonus amount information.

Each time HR client 402 submits queries in order to generate a report, federation engine 406 determines subqueries for people 410 and bonuses 412 in order to retrieve data from the name column of people 410 and amount column of bonuses 412. The data results from each table are aggregated at federation engine 406 and returned to HR client 402 in response to the queries.

Each of the data queries submitted by HR client 402 are canonicalized and grouped into a viewable set by federation engine 408. Federation engine 408 generates a view suggestion corresponding to the viewable set of queries relating to querying name and amount information from people 410 and bonuses 412, respectively.

Data architect 414 connects to federation engine 406 remotely and browses the viewable sets and view suggestions. Data architect 414 is able to quickly see that the viewable set of queries pertaining to access of data from people 410 and bonuses 412 together is very large and that the queries are frequently occurring. Accordingly, data architect 414 creates a virtual view 408, which contains aggregated data from both people 410 and the bonuses 412. Once view 408 is created, data architect 414 enables the view suggestion for view 408.

After view 408 is created, HR client 402 again submits a query in order to determine people 410 and bonuses 412 data for the report. Federation engine 406 processes the query as usual, however, since the view suggestion is enabled, federation engine 406 also returns the view suggestion along with the query response. The view suggestion in this example is the syntax that HR client 402 may use to query view 408. The next time HR client 402 executes the query, HR client 402 uses the syntax provided by the view suggestion, and federation engine 406 accesses the people 410 and bonuses 412 data directly from view 408, rather than by sending sub-queries to people 410 and bonuses 412.

As shown in this example, the invention allows for efficiently determining views for a data architect to create and efficiently providing access to those created views to users.

Figure 5:
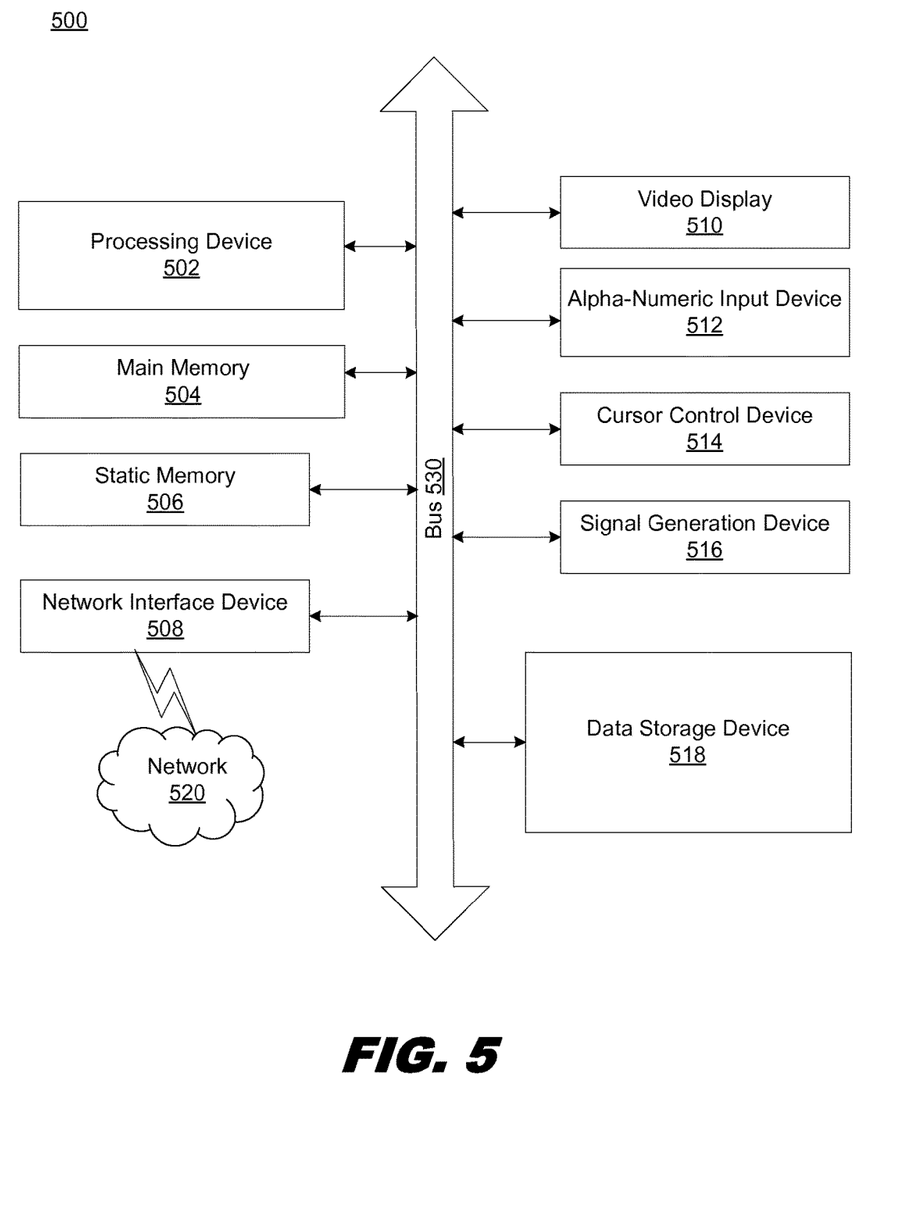
FIG. 5 is a block diagram illustrating an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Exemplary computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A federated system, comprising:
a non-transitory memory; and
at least one hardware processor coupled to the non-transitory memory and configured to read instructions from the non-transitory memory to perform operations comprising:
performing a first similarity search of a canonical query database to group a plurality of canonical queries into a viewable set, wherein the viewable set is associated with a view suggestion;
converting a received query to a canonical query, the converting including transforming a join operator to an equivalent cross join operator and one or more of removing a constant from a "WHERE" clause or ordering items in a clause;
inserting the canonical query into the canonical query database;
performing a second similarity search of the canonical query database to determine a similarity between the canonical query and the plurality of canonical queries; and
after determining the similarity, sending the view suggestion and a query result to a client.

2. The federated system of claim 1, wherein performing at least one of the first similarity search or the second similarity search comprises approximate string matching.

3. The federated system of claim 1, wherein performing at least one of the first similarity search or the second similarity search comprises reducing a similarity requirement corresponding to a "SELECT" clause.

4. The federated system of claim 1, wherein the first similarity search includes a periodic search that occurs at a user-configured time interval.

5. The federated system of claim 1, wherein the view suggestion is initially set to disabled.

6. The federated system of claim 1, the operations further comprising:
editing the view suggestion based on a created view; and
enabling the view suggestion.

7. A computer-implemented method comprising:
searching a query data store for a set of similar queries;
converting a received query to a canonical query, the converting including transforming a join operator to an equivalent cross join operator and one or more of removing a constant from a "WHERE" clause or ordering items in a clause;
inserting the received query and the canonical query into a query data store;
performing a similarity search of one or more viewable sets stored in the query data store to determine a similarity between the canonical query and one or more canonical queries associated with a viewable set of the one or more viewable sets;
returning a view suggestion associated with the viewable set;
creating the viewable set to include the set of similar queries; and
associating the view suggestion with the viewable set.

8. The method of claim 7, wherein the converting of the received query to the canonical query further comprises:
removing constants from any "WHERE" clauses; and
ordering any items in each clause.

9. The method of claim 7, wherein the determining of the similarity comprises approximate string matching.

10. The method of claim 7, wherein the determining of the similarity comprises reducing a similarity requirement corresponding to a "SELECT" clause.

11. The method of claim 7, wherein the view suggestion is initially set to disabled.

12. The method of claim 11, further comprising:
creating a view based on the view suggestion;
enabling the view suggestion; and
sending the view suggestion and a query result to a client.

13. A non-transitory computer-readable medium comprising computer-readable instructions, the computer-readable instructions executable by at least one processor to perform operations comprising:
searching a query data store for a set of similar queries;
converting a received query to a canonical query, the converting including transforming a join operator to an equivalent cross join operator and one or more of removing a constant from a "WHERE" clause or ordering items in a clause;
inserting the received query and the canonical query into the query data store;
searching one or more viewable sets stored in the query data store to determine a similarity between the canonical query and one or more canonical queries associated with the one or more viewable sets;
returning a view suggestion associated with a viewable set of the one or more viewable sets;
creating the viewable set to include the set of similar queries; and
associating the view suggestion with the viewable set.

14. The non-transitory computer-readable medium of claim 13, wherein the converting the received query to the canonical query further comprises:
removing constants from any "WHERE" clauses; and
ordering any items in each clause.

15. The non-transitory computer-readable medium of claim 13, wherein the view suggestion is initially set to disabled.

16. The non-transitory computer-readable medium of claim 15, the operations further comprising:
creating a view based on the view suggestion;
enabling the view suggestion; and
sending the view suggestion and a query result to a client.

17. The non-transitory computer-readable medium of claim 13, wherein the determining of the similarity comprises approximate string matching.

18. The non-transitory computer-readable medium of claim 13, wherein the determining of the similarity comprises reducing a similarity requirement corresponding to a "SELECT" clause.

* * * * *